United States Patent
Burns

(10) Patent No.: US 7,974,414 B2
(45) Date of Patent: Jul. 5, 2011

(54) METHODS AND APPARATUS FOR AUTOMATICALLY GROUPING USER-SPECIFIC INFORMATION IN A MOBILE STATION

(75) Inventor: Anthony George Burns, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1184 days.

(21) Appl. No.: 10/789,556

(22) Filed: Feb. 27, 2004

(65) Prior Publication Data

US 2005/0190918 A1  Sep. 1, 2005

(51) Int. Cl.
*H04K 1/00* (2006.01)
(52) U.S. Cl. ......... 380/270; 380/247; 713/168; 713/170
(58) Field of Classification Search .................. 380/270
See application file for complete search history.

(56) References Cited

U.S. PATENT DOCUMENTS

| | | | | |
|---|---|---|---|---|
| 5,742,509 | A * | 4/1998 | Goldberg et al. | 701/211 |
| 5,937,352 | A * | 8/1999 | Courtney et al. | 455/435.1 |
| 6,175,741 | B1 * | 1/2001 | Alperovich | 455/458 |
| 6,977,909 | B2 * | 12/2005 | Minborg | 370/260 |
| 7,058,686 | B2 * | 6/2006 | Jin | 709/206 |
| 7,519,381 | B2 * | 4/2009 | Klassen et al. | 455/466 |

(Continued)

FOREIGN PATENT DOCUMENTS

EP  1271336 A2  1/2003

(Continued)

OTHER PUBLICATIONS

"European Search Report for Application 04251118.8", Jul. 30, 2004.

*Primary Examiner* — Kambiz Zand
*Assistant Examiner* — Yonas Bayou
(74) *Attorney, Agent, or Firm* — John J. Oskorep, Esq.

(57) ABSTRACT

Methods and apparatus for automatically grouping user-specific information items (400) in a mobile station (102) are disclosed. In one illustrative example, a method includes the steps of reading a first user-specific information item (404, 406, 408, or 410) associated with a first file or application of the mobile station (102); storing the first user-specific information item (404, 406, 408, or 410) in a user information file or message (402) of the mobile station (102); and repeating the acts of reading and storing for at least a second user-specific information item (404, 406, 408, or 410) associated with a second file or application of the mobile station (102), so that the first and the second user-specific information items are grouped together as user information in the user information file or message (402). Examples of user-specific information items (400) include a user name (404) associated with an end user of the mobile station (102), a telephone number (406) (e.g. an IMSI) of the mobile station (102), an e-mail address (408) associated with an e-mail communication application of the mobile station (102), and a Personal Identification Number (PIN) (410) of the mobile station (102). The user information file or message (402) containing the user-specific information items (400) may easily be transmitted from the mobile station (102) to one or more recipients through a wireless communication network (104) in a message such as an e-mail or PIN message.

17 Claims, 7 Drawing Sheets

U.S. PATENT DOCUMENTS

| | | |
|---|---|---|
| 7,590,696 B1 * | 9/2009 | Odell et al. ............ 709/206 |
| 2001/0025248 A1 | 9/2001 | Nihei |
| 2001/0027478 A1 * | 10/2001 | Meier et al. ............ 709/206 |
| 2002/0023230 A1 | 2/2002 | Bolnick et al. |
| 2002/0069243 A1 | 6/2002 | Raverdy et al. |
| 2002/0082054 A1 * | 6/2002 | Keinonen et al. ......... 455/567 |
| 2002/0084888 A1 * | 7/2002 | Jin ................... 340/7.21 |
| 2002/0128047 A1 | 9/2002 | Gates |
| 2002/0176581 A1 * | 11/2002 | Bilgic et al. ............ 380/270 |
| 2003/0033522 A1 * | 2/2003 | Bilgic et al. ............ 713/168 |
| 2007/0197231 A1 * | 8/2007 | Lin ................... 455/456.1 |
| 2008/0010334 A1 * | 1/2008 | Kovales et al. ......... 709/200 |

FOREIGN PATENT DOCUMENTS

| | | |
|---|---|---|
| GB | 2386797 A | 9/2003 |
| WO | WO 03/065678 A2 | 8/2003 |

* cited by examiner

METHODS AND APPARATUS FOR AUTOMATICALLY GROUPING USER-SPECIFIC INFORMATION IN A MOBILE STATION

BACKGROUND

1. Field of the Technology

The present application relates generally to mobile stations which communicate voice and data through wireless communication networks, and more particularly to methods and apparatus for automatically grouping user-specific information in such mobile stations.

2. Description of the Related Art

Present-day wireless communication devices, such as cellular mobile stations, are capable of making and receiving telephone calls and communicating messages and data through wireless communication networks. Such mobile stations are known to facilitate services such as wireless e-mail and Internet access as well as voice telephony. Several applications may be provided in these mobile stations, including a voice telephony application, an e-mail application, an address book application, and a calendar/scheduling application, as some examples. Various user-specific information items associated with these applications (a user name, a telephone number, an e-mail address, etc.) are independently stored and maintained as separate items in the mobile station. Since these items are independently stored and maintained, it is often difficult for the end user or subscriber of the mobile station to personally manage or communicate this information as a whole.

Accordingly, there is a resulting need for methods and apparatus that overcome the deficiencies of the prior art.

SUMMARY

Methods and apparatus for automatically grouping user-specific information items in a mobile station are described herein. In one illustrative example, the method includes the steps of reading a first user-specific information item associated with a first file or application of the mobile station; storing the first user-specific information item in a user information file or message of the mobile station; and repeating the acts of reading and storing for at least a second user-specific information item associated with a second file or application of the mobile station, so that the first and the second user-specific information items are grouped together as user information in the user information file or message. Examples of user-specific information items include a user name associated with an end user of the mobile station, a telephone number of the mobile station, an e-mail address associated with an e-mail communication application of the mobile station, and a Personal Identification Number (PIN) of the mobile station. The user information file or message containing the user-specific information items may easily be sent from the mobile station to one or more recipients through a wireless communication network in a message such as an e-mail or PIN message.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for automatically grouping user-specific information items in a mobile station are described herein. In one illustrative example, the method includes the steps of reading a first user-specific information item associated with a first file or application of the mobile station; storing the first user-specific information item in a user information file or message of the mobile station; and repeating the acts of reading and storing for at least a second user-specific information item associated with a second file or application of the mobile station, so that the first and the second user-specific information items are grouped together as user information in the user information file or message. Examples of user-specific information items include a user name associated with an end user of the mobile station, a telephone number of the mobile station, an e-mail address associated with an e-mail communication application of the mobile station, and a Personal Identification Number (PIN) of the mobile station. The user information file or message containing the user-specific information items may easily be sent from the mobile station to one or more recipients through a wireless communication network in a message such as an e-mail or PIN message.

Figure 1:
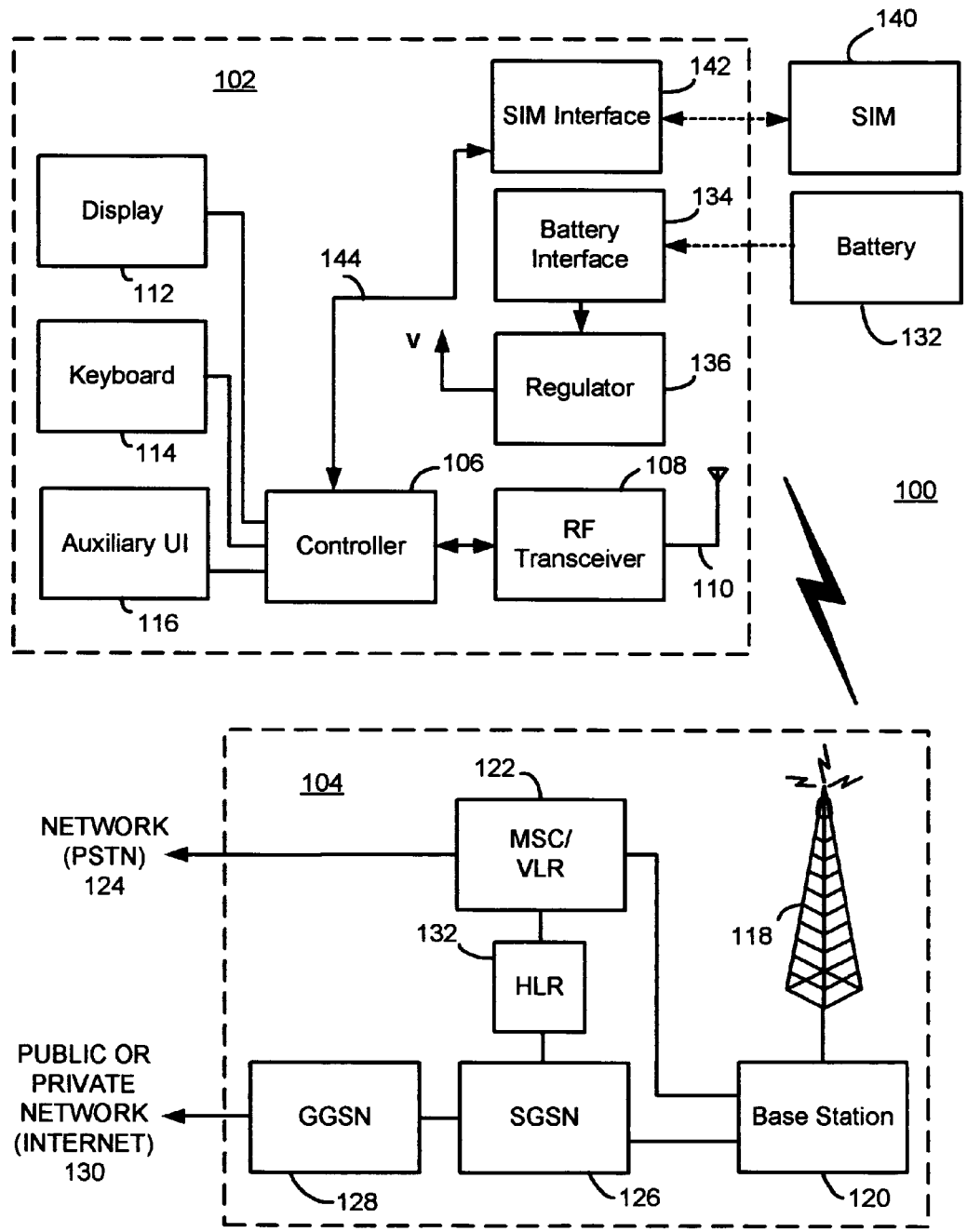
FIG. 1 is a block diagram of a communication system which includes a mobile station for communicating in a wireless communication network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to (most if not all) electrical circuitry in mobile station 102, and battery interface 132 provides for a mechanical and electrical connection for battery 132. Battery interface 132 is coupled to a regulator 136 which regulates power for the device. When mobile station 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of mobile station 102. Similarly, an RF receiver of RF transceiver circuitry 108 is typically periodically turned off to conserve power until it is needed to receive signals or information (if at all) during designated time periods.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 200 of FIG. 2.

Mobile station 102 operates using a Subscriber Identity Module (SIM) which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile device terminal is not fully operational for communication through wireless network 104. By inserting SIM 140 into mobile station 102, an end user can have access to any and all of his/her subscribed services. In order to identify the subscriber, SIM 140 contains some user parameters such as an International Mobile Subscriber Identity (IMSI). An advantage of using SIM 140 is that end users are not necessarily bound by any single physical mobile device. Typically, the only element that personalizes a mobile device terminal is a SIM card. Therefore, the user can access subscribed services using any mobile device equipped to operate with the user's SIM. SIM 140 generally includes a processor and memory for storing information. SIM and its interfacing standards are well known. For interfacing with a standard GSM device having SIM interface 142, a conventional SIM 140 has six (6) connections. Note that, if mobile station 102 operates in accordance with a different communication standard, it may utilize a different memory module such as a Removable User Identity Module (R-UIM).

Mobile station 102 communicates through wireless communication network 104. In the embodiment of FIG. 1, wireless network 104 operates in accordance with a Global Systems for Mobile (GSM) and General Packet Radio Service (GPRS). Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122 and SGSN 126.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile stations registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
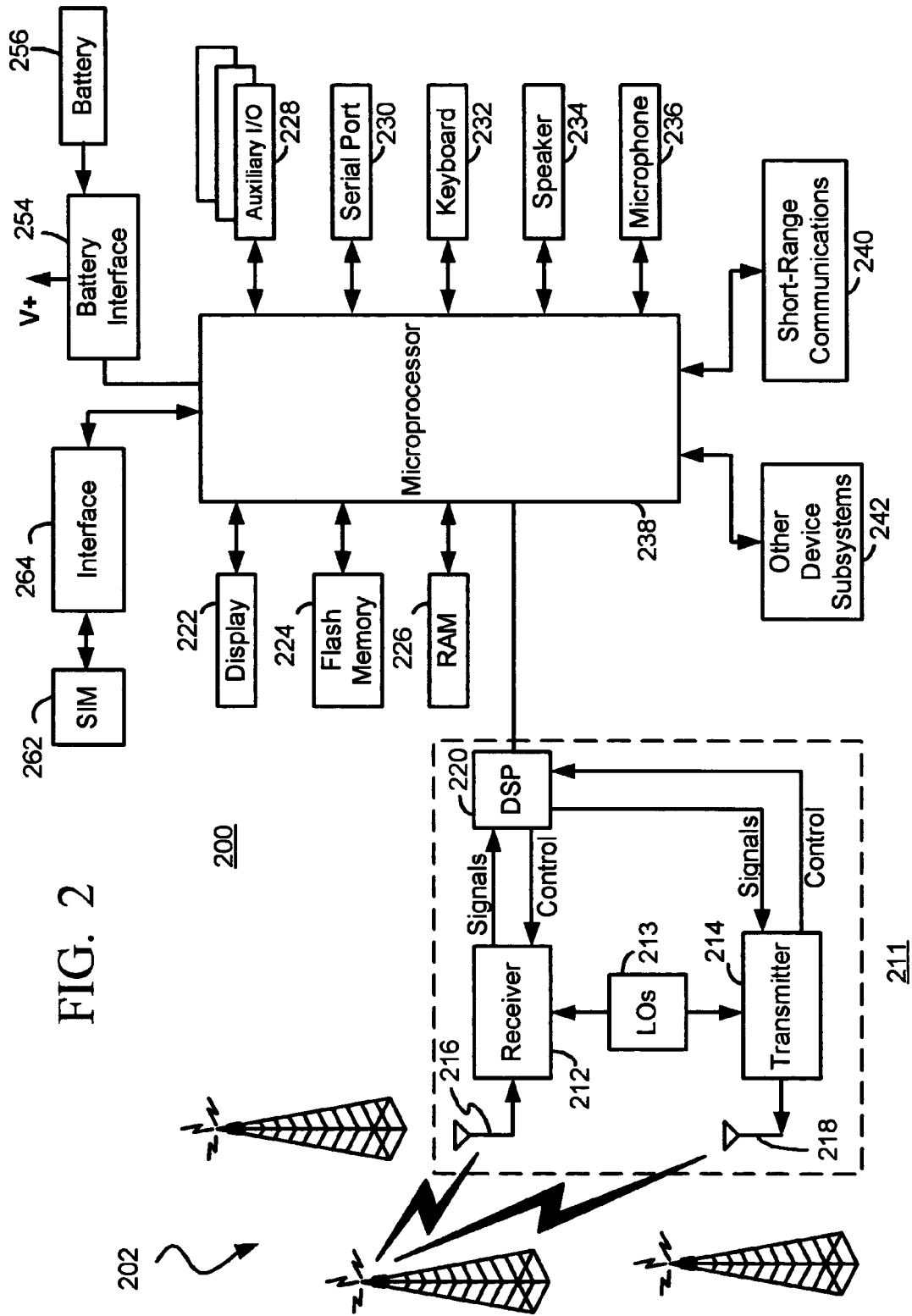
FIG. 2 is a more detailed example of a mobile station for use in the wireless communication network.

FIG. 2 is a detailed block diagram of a preferred mobile station, namely a mobile station 200. Mobile station 200 is preferably a two-way communication device having voice and data communication capabilities, including the capability to communicate with other computer systems. Depending on the functionality provided by mobile station 200, it may be referred to as a data messaging device, a two-way pager, a cellular telephone with data messaging capabilities, a wireless Internet appliance, or a data communication device (with or without telephony capabilities).

If mobile station 200 is enabled for two-way communication, it will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 200 is intended to operate.

Network access requirements will also vary depending upon type of network utilized. In GPRS networks, for example, network access is associated with a subscriber or user of mobile station 200. A GPRS device therefore requires a Subscriber Identity Module, commonly referred to as a "SIM" 262, in order to operate on the GPRS network. Without such a SIM 262 inserted in a SIM interface 264, a GPRS device will not be fully functional. Local or non-network communication functions (if any) may be operable, but mobile station 200 will be unable to carry out any functions involving communications over the network. SIM 262 includes those features described in relation to FIG. 1. Note that, if mobile station 200 operates according to an alternative communication standard, it may utilize a different memory module such as a Removable User Identity Module (R-UIM).

Mobile station 200 will operate in connection with one of a plurality of base stations 202 associated with the same or different networks at any given time. Mobile station 200 may send and receive communication signals with the selected network after required network registration or activation procedures have been completed. Network selection of the present application is described in relation to FIG. 6 below. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 200 includes a microprocessor 238 (which is one implementation of controller 106 of FIG. 1) which controls overall operation of mobile station 200. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 200. A predetermined set of applications which control basic device operations, including at least data and voice communication applications (such as a network re-establishment scheme), will normally be installed on mobile station 200 during its manufacture. A preferred application that may be loaded onto mobile station 200 may be a personal information manager (PIM) application having the ability to organize and manage data items relating to user such as, but not limited to, e-mail, calendar events, voice mails, appointments, and task items. Naturally, one or more memory stores are available on mobile station 200 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 200 with respect to such items. This is especially advantageous where the host computer system is the mobile station user's office computer system. Additional applications may also be loaded onto mobile station 200 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 200 and may provide enhanced on-device functions, communication-related functions, or both. For example, secure communication applications may enable electronic commerce functions and other such financial transactions to be performed using mobile station 200.

Mobile station 200 also includes a Personal Identification Number (PIN) which is permanently stored in memory (e.g. Flash memory 224). The PIN is hardware-specific and unique to each mobile station, and may be based on a 7-digit format of "XXXXXXX". The PIN of mobile station 200 can be used to receive PIN messages from other mobile stations having PINs, as well as send PIN messages from mobile station 200 to other mobile stations. PIN messaging is similar to e-mail messaging but without use of an intermediate mailbox.

In a data communication mode, a received signal such as a message or web page download will be processed by communication subsystem 211 and input to microprocessor 238. Microprocessor 238 will preferably further process the signal for output to display 222 or alternatively to auxiliary I/O device 228. A user of mobile station 200 may also compose data items, such as e-mail messages, PIN messages, or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 200 is substantially similar to data communication, except that the received signals would be output to speaker 234 and signals for transmission would be generated by microphone 236. Alternative voice or audio I/O subsystems, such as a voice message recording subsystem, may also be implemented on mobile station 200. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 200 by providing for information or software downloads to mobile station 200 other than through a wireless communication network. The alternate download path may, for example, be used to load an encryption key onto mobile station 200 through a direct and thus reliable and trusted connection to thereby provide secure device communication.

Short-range communications subsystem 240 of FIG. 2 is an additional optional component which provides for communication between mobile station 200 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Mobile station 200 also includes a battery interface 254 for receiving one or more rechargeable batteries 256. Such a battery 256 provides electrical power to most if not all electrical circuitry in mobile station 200, and the battery interface 254 provides for a mechanical and electrical connection for it. Thus, mobile station 200 is afforded some portability. Battery interface 254 is coupled to a regulator (not shown in FIG. 2) which regulates power to all of the circuitry.

Figure 3:
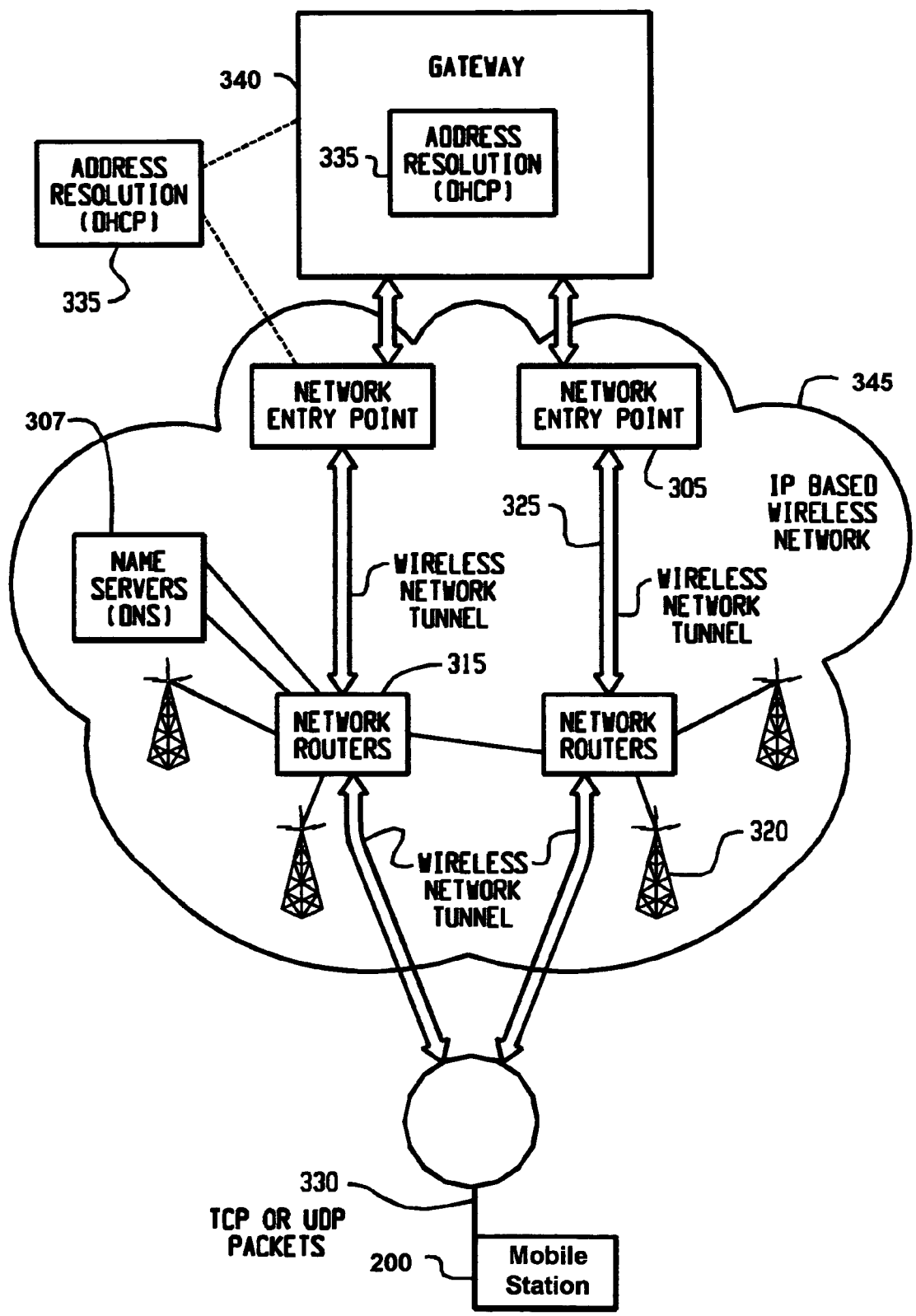
FIG. 3 is a particular system infrastructure for communications with the mobile station.

FIG. 3 shows a particular system infrastructure for communicating with a wireless communication device, such as the mobile station described in relation to FIGS. 1-2. In particular, FIG. 3 shows basic components of an IP-based wireless data network, such as a GPRS network. Mobile station 200 communicates with a wireless packet data network 345, and may also be capable of communicating with a wireless voice network (not shown). The voice network may be associated with IP-based wireless network 345 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 340 may be coupled to an internal or external address resolution component 335 and one or more network entry points 305. Data packets are transmitted from gateway 340, which is source of information to be transmitted to mobile station 200, through network 345 by setting up a wireless network tunnel 325 from gateway 340 to mobile station 200. In order to create this wireless tunnel 325, a unique network address is associated with mobile station 200. In an IP-based wireless network, however, network addresses are typically not permanently assigned to a particular mobile station 200 but instead are dynamically allocated on an as-needed basis. It is thus preferable for mobile station 200 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to mobile stations such as mobile station 200.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, mobile station 200 must use a specific technique associated with wireless network 345. The step of opening such a wireless tunnel 325 may require mobile station 200 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 200 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 200. When an IP address has been allocated to mobile station 200 and communicated to gateway 340, information can then be forwarded from gateway 340 to mobile station 200.

Wireless tunnel 325 typically has a limited life, depending on mobile station's 100 coverage profile and activity. Wireless network 345 will tear down wireless tunnel 325 after a certain period of inactivity or out-of-coverage period, in order to recapture resources held by this wireless tunnel 325 for other users. The main reason for this is to reclaim the IP address temporarily reserved for mobile station 200 when wireless tunnel 325 was first opened. Once the IP address is lost and wireless tunnel 325 is torn down, gateway 340 loses all ability to initiate IP data packets to mobile station 200, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS).

Figure 4:
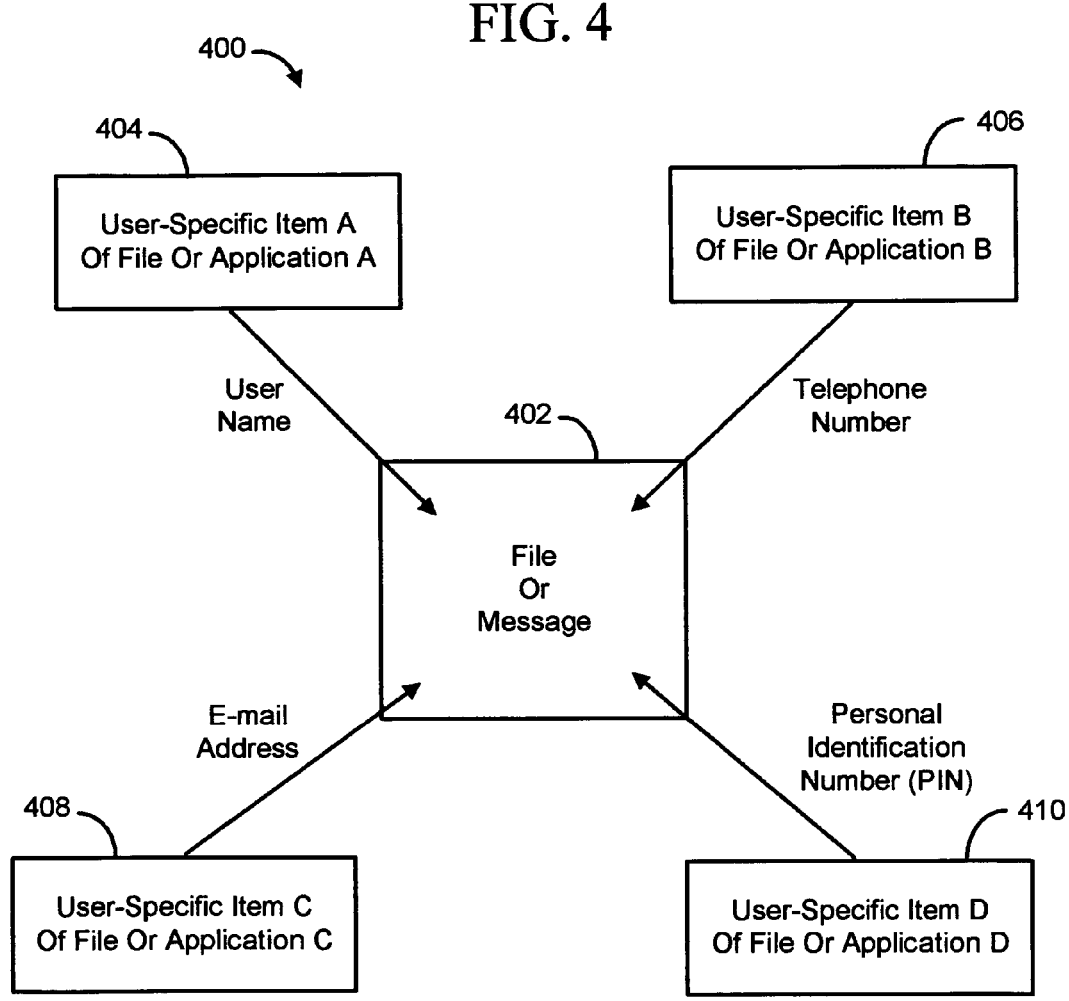
FIG. 4 is a data flow diagram relating to a method of automatically grouping user-specific information items in a mobile station.

FIG. 4 is a data flow diagram relating to a method of the present application. Broadly, a plurality of user-specific information items 400 of the mobile station are automatically grouped together by the mobile station into a central or master user information file or message 402. File or message 402 may be a text file, an address book file, or a newly composed e-mail or PIN message, as some examples, which is stored in memory of the mobile station. It is preferred that at least two user-specific information items associated with at least two different files or applications of the mobile station are grouped together in the same file or message.

In the present embodiment shown in FIG. 4, the user-specific information items 400 include four (4) user-specific information items 404, 406, 408, and 410. User-specific information item 404 (Item "A") is associated with a file or application A of the mobile station; user-specific information item 406 (Item "B") is associated with a file or application B of the mobile station; user-specific information item 408 (Item "C") is associated with a file or application C of the mobile station; and user-specific information item 410 (Item "D") is associated with a file or application D of the mobile station. User-specific information items 400 may include additional or fewer of these items and, if they include additional items, may include other suitable information such as a residential and/or business address of the end user of the mobile station, etc.

In the present embodiment, user-specific information item 404 is a user name associated with an end user of the mobile station; user-specific information item 406 is a telephone number of the mobile station; user-specific information item 408 is an e-mail address associated with an e-mail communication application of the mobile station; and user-specific information item 410 is a personal identification number (PIN) of the mobile station. The user name may be stored as address book or user account information associated with the mobile station, as some examples. The telephone number may be stored in programmable memory of the mobile station, and is preferably an International Mobile Subscriber Identification (IMSI) number which is stored in a SIM or R-UIM card which is inserted in the mobile station. As described earlier above, the mobile station also includes a PIN which is permanently stored in memory (e.g. Flash memory). The PIN is hardware-specific and unique to each mobile station, and may be based on a 7-digit format of "XXXXXXX". The PIN of the mobile station can be used to receive PIN messages from other mobile stations having PINs, as well as send PIN messages from the mobile station to other mobile stations. PIN messaging is similar to e-mail messaging but without use of an intermediate mailbox. It is desirable to communicate the PIN to other devices so that the PIN messaging function can be utilized.

Figure 5:
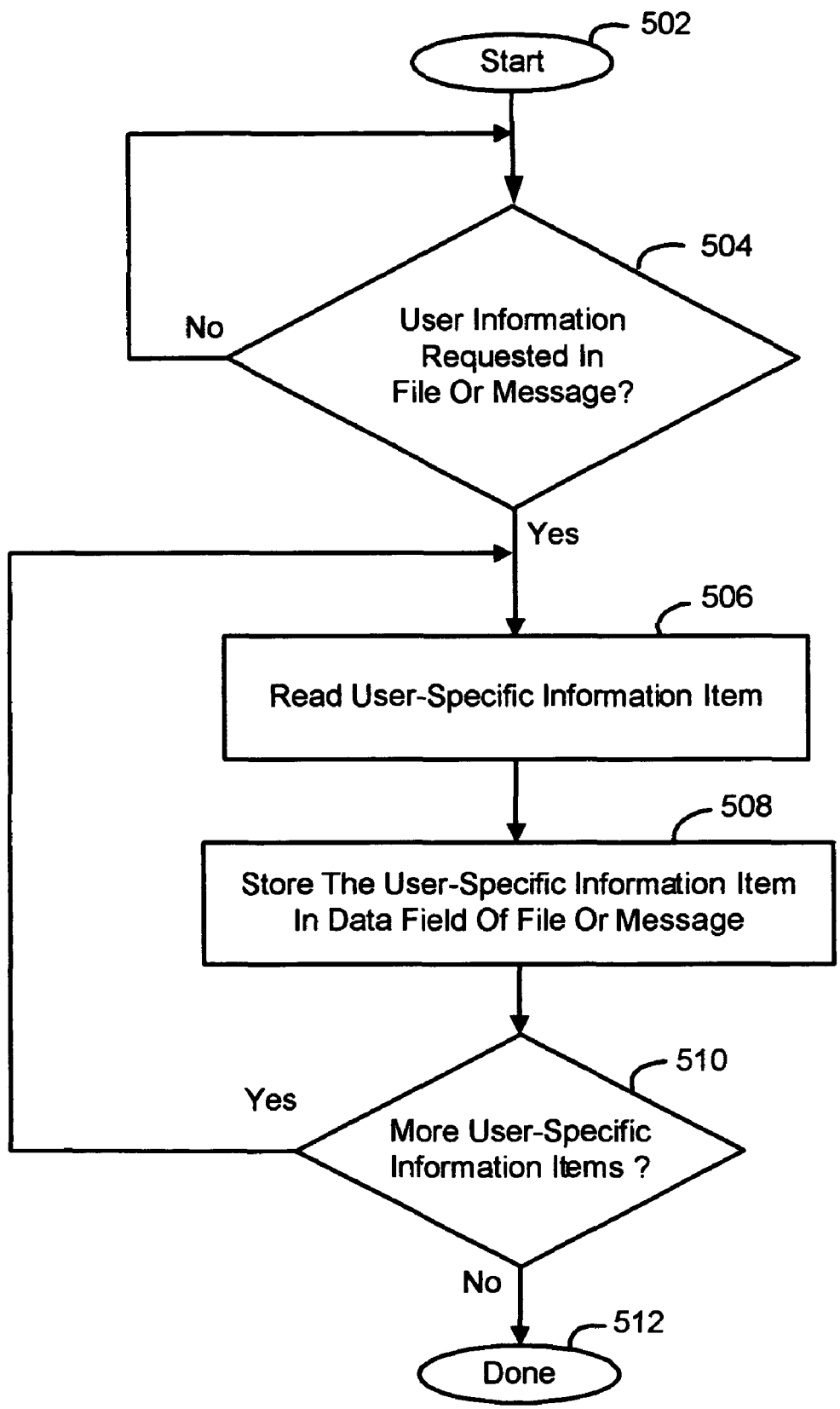
FIG. 5 is a flowchart for describing a method of automatically grouping user-specific information items in the mobile station.

FIG. 5 is a flowchart for describing a method of automatically grouping user-specific information items, such as those items described in relation to FIG. 4, in a mobile station. The method may be performed by a controller or processor (e.g. a microprocessor) of the mobile station (e.g. see FIGS. 1-2). Further, the method may be embodied in a computer program product which includes a computer storage medium (e.g.

memory or computer disk) having computer instructions stored therein which are executable by the controller or processor. Beginning at a start block 502 of FIG. 5, the processor identifies whether user information is requested in a file or message of the mobile station (step 504). If the user information is not requested in step 504, the processor continues monitoring for such request. If the user information is requested in step 504, then the processor begins to perform an automatic grouping of the user-specific information items.

In performing the automatic grouping, the processor reads a user-specific information item associated with a file or application of the mobile station (step 506). Next, the processor stores the user-specific information item in a central or master file or message of the mobile station (step 508). If the user-specific information item is stored in a central or master file, the central or master file may be a text file, an address book file, or a newly composed e-mail or PIN message, as some examples. If the user-specific information item is stored in a message, the message may be an e-mail message associated with an e-mail communication application of the mobile station, an SMS message, a PIN message, or a data input field of a web page form.

If additional user-specific information items are needed (step 510), then the processor repeats the procedure at step 506 for the next user-specific information item. Specifically, the processor reads the next user-specific information item associated with a next file or application of the mobile station (step 506). The processor then stores this next user-specific information item in the same central or master file or message of the mobile station (step 508). If even further user-specific information items are needed as identified in step 510, the processor repeats this procedure again at step 506 for the other user-specific information items associated with other files or applications of the mobile station. If no other items are needed at step 510, the flowchart of the method is done at a block 512. In the method described, the processor is operative to group at least two user-specific information items into the file or message.

In the present embodiment of FIG. 4, at least four user-specific information items are grouped which include the user name associated with the end user of the mobile station, the telephone number of the mobile station, the e-mail address associated with the e-mail communication application of the mobile station, and the PIN of the mobile station. Note also that the request in step 504 is performed in response to a trigger signal detected by the processor. The trigger signal may be caused by an expiration of a regular or periodic timer kept by the processor (i.e. for a regular or periodic updating of the user information), a user input request for the user information in the central or master file, a user input request for the user information in a message, or an update to a user-specific information item made by the end user at the mobile station.

Figure 6:
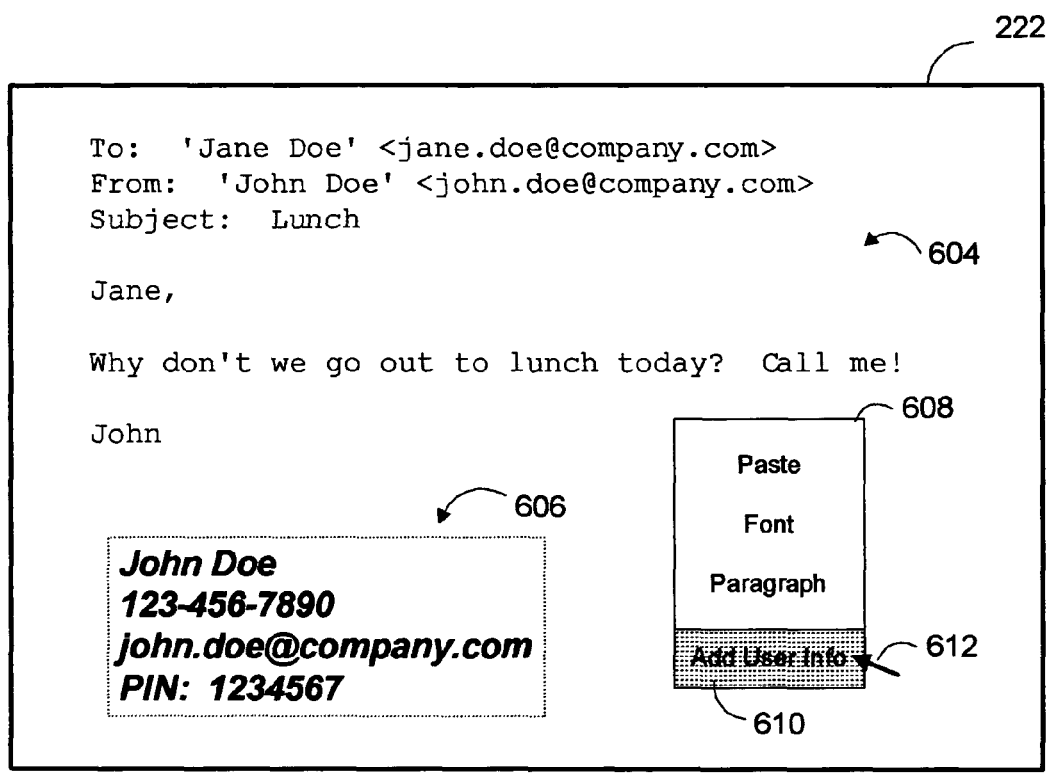
FIG. 6 is an illustrative example of a message which is displayed in a visual display of the mobile station and how user-specific information items may be included within such message.

FIG. 6 is an illustrative example of a message which is displayed in visual display 222 of the mobile station and how user-specific information items may be included within such message. In particular, visual display 222 is shown as displaying an e-mail message 604 that the end user has drafted with use of an e-mail application. A pull-down menu 608 is provided for the e-mail application which includes a number of different options to edit e-mail message 604. In particular, one option in pull-down menu 608 is an "Add User Information" option 610. In response to the end user selecting the "Add User Information" option 610 via the user interface (e.g. with use of a cursor 612), the e-mail application causes user information 606 which includes a plurality of user-specific information items to be inserted as text within e-mail message 604. The grouping of these user-specific information items within e-mail message 604 may be performed by reading the items directly from their original files or, alternatively, by reading the items from the central or master file which is maintained by the mobile station.

In the present embodiment, user information 606 is shown to include four (4) user-specific information items including a user name associated with an end user of the mobile station (e.g. "John Doe"), a telephone number associated with the mobile station (e.g. "123-456-7890"), an e-mail address associated with the end user (e.g. "john.doe@company.com"), and a PIN associated with the mobile station (e.g. "1234567"). The mobile station utilizes the techniques described in relation to FIG. 4-5 of the present application to facilitate the insertion of the user information within this message 604. The end user of the mobile station will ultimately cause e-mail message 604 with user information 606 to be transmitted to one or more recipients (e.g. another mobile station or an e-mail mailbox) through the wireless communication network. As an alternative to inserting user information 606 within e-mail message 604 as shown and described, user information 606 may be included in a file which is sent as an attachment to e-mail message 604.

Note that FIG. 5 is merely one example in which an automatic grouping of user-specific information items may be utilized in the mobile station. The trigger signal in the example of FIG. 5 is a user input request for the user information in the message. In other cases where a central or master file is utilized, however, the grouping may be triggered by an expiration of a regular or periodic timer kept by the processor (i.e. for regularly or periodically updated the user information), by a user input request for the user information in the central or master file, or by an update to a user-specific information item made by the end user at the mobile station. Also, instead of an e-mail message, the message may alternatively be any suitable message which can be sent from the mobile station to one or more recipients.

Figure 7:
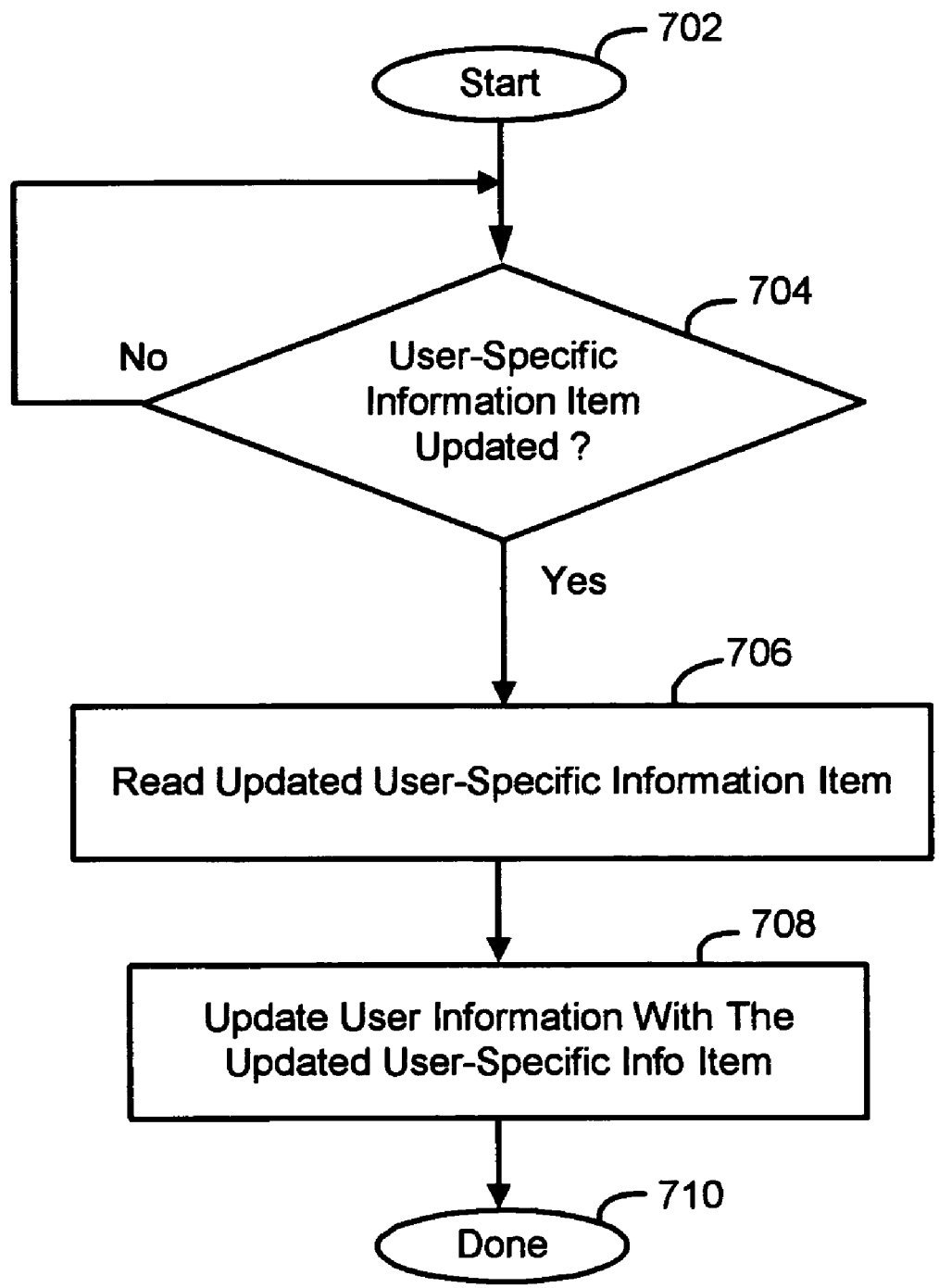
FIG. 7 is a flowchart for describing a method for facilitating the automatic grouping of user-specific information items in the mobile station.

FIG. 7 is a flowchart for describing an optional method for facilitating the automatic grouping of user-specific information items in the mobile station. Again, the method may be performed by a controller or processor (e.g. a microprocessor) of the mobile station (e.g. see FIGS. 1-2). Further, this method may be embodied in a computer program product which includes a computer storage medium (e.g. memory or computer disk) having computer instructions stored therein which are executable by the controller or processor. Beginning at a start block 702 of FIG. 7, the processor identifies whether an update to a user-specific information item associated with a file or application has been made at the mobile station (step 704). The update may be caused by the end user at the user interface of the mobile station. For example, the update may be caused by the insertion of a new memory module (SIM or R-UIM) in the mobile station and/or the addition of a new or updated e-mail account for the e-mail application, as examples. If no update has occurred at step 704, the processor continues monitoring for such update. If the user-specific information item is updated in step 704, then the processor proceeds to update the user-specific information item in the central or master file. In performing the update, the processor reads the updated user-specific information item associated with the file or application (step 706) and updates the user-specific information item in the central or master file with the updated item (step 708). Preferably, the updating in steps 706 and 708 also occurs for at least some of the other user-specific information items stored in the central or master file at the time they are updated in their associated file or application.

Advantageously, various user-specific information items that are associated with various files or applications and independently stored and maintained as separate items in the mobile station are automatically combined so that the end user or subscriber can utilize and/or communicate the user information as a whole to others.

Final Comments. Methods and apparatus for automatically grouping user-specific information items in a mobile station are described. In one illustrative example, the method includes the steps of reading a first user-specific information item associated with a first file or application of the mobile station; storing the first user-specific information item in a user information file or message of the mobile station; and repeating the acts of reading and storing for at least a second user-specific information item associated with a second file or application of the mobile station, so that the first and the second user-specific information items are grouped together as user information in the user information file or message. Examples of user-specific information items include a user name associated with an end user of the mobile station, a telephone number (e.g. an IMSI) of the mobile station, an e-mail address associated with an e-mail communication application of the mobile station, and a PIN of the mobile station. The user information file or message containing the user-specific information items may easily be sent to one or more recipients through a wireless communication network in a message such as an e-mail or PIN message.

A mobile station of the present application includes a wireless transceiver; an antenna coupled to the wireless transceiver; a processor coupled to the wireless transceiver; and memory. The processor is operative to read a first user-specific information item associated with a first file or application stored in the memory; store the first user-specific information item in a user information file or message; and repeat the reading and storing for at least a second user-specific information item associated with a second file or application stored in the memory, so that the first and the second user-specific information items are grouped together as user information in the user information file or message. The processor is further operative to cause the user information or message containing the user-specific information items to be transmitted through the wireless transceiver to one or more recipients through a wireless communication network.

In a related technique, a method for facilitating the grouping of user-specific information items is performed in response to an update to a user-specific information item associated with a file or application of the mobile station. The steps include, in response to the update, reading the user-specific information item associated with the file or application of the mobile station; and storing the user-specific information item in a user information file of the mobile station which has a plurality of stored user-specific information items.

Advantageously, various user-specific information items that are associated with various files or applications and independently stored and maintained as separate items in the mobile station are automatically combined so that the end user or subscriber can utilize and/or communicate the user information as a whole to others.

The above-described embodiments of invention are intended to be examples only. Alterations, modifications, and variations may be effected to particular embodiments by those of skill in art without departing from scope of invention, which is defined solely by claims appended hereto.

What is claimed is:

1. A method performed by a mobile station for automatically grouping user-specific information items in an e-mail message, the mobile station having a user interface which includes a display, the mobile station storing a first file for use with a voice call application of the mobile station, the first file including a telephone number which is utilized for identifying or contacting a user in the voice call application, the mobile station further storing a second file for use with an e-mail communication application of the mobile station, the second file including an e-mail address which is utilized for identifying or contacting the user in the e-mail communication application, the method comprising the acts of:

receiving, via the user interface, with use of the e-mail communication application, a draft e-mail message and causing the draft e-mail message to be displayed in the display;

detecting, by the mobile station, a selection of an option to add the user-specific information items to the draft e-mail message while the draft e-mail message is being displayed;

in response to detecting the selection of the option, automatically grouping, by the mobile station, the user-specific information items in the draft e-mail message by performing the following acts:

reading, by the mobile station, from the first file stored in the mobile station, the telephone number which is utilized for identifying or contacting the user in the voice call application;

storing, by the mobile station, in the draft e-mail message, the telephone number read from the first file;

reading, by the mobile station, from the second file stored in the mobile station, the e-mail address which is utilized for identifying or contacting the user in the e-mail communication application;

storing, by the mobile station, in the e-mail message, the e-mail address read from the second file, so that the telephone number and the e-mail address are automatically grouped together by the mobile station in the draft e-mail message in response to detecting the selection of the option; and after the telephone number and the e-mail address have been automatically grouped by the mobile station in the draft e-mail message, causing the e-mail message to be transmitted from the mobile station via a wireless communication network.

2. The method of claim 1, further comprising:

causing a menu to be displayed in the display, the menu including the option to add the user-specific information items to the draft e-mail message.

3. The method of claim 1, wherein the mobile station stores a third file for use with a PIN messaging application of the mobile station, the third file including a personal identification number (PIN) which is utilized for identifying or contacting the user in the PIN messaging application, the method comprising the further acts of:

reading, by the mobile station from the third file stored in the mobile station, the PIN which is utilized for identifying or contacting the user in the PIN messaging application of the mobile station; and storing, by the mobile station in the draft e-mail message, the PIN, so that the telephone number, the e-mail address, and the PIN are automatically grouped together by the mobile station in the draft e-mail message in response to detecting the selection of the option.

4. The method of claim 1, further comprising:

sending the e-mail message from the mobile station to one or more recipients via the wireless communication network.

5. The method of claim 1, further comprising:
sending the e-mail message through a wireless communication network.

6. The method of claim 1, wherein the trigger signal is produced in response to a user selection of the option.

7. A mobile station, comprising:
a wireless transceiver;
a processor coupled to the wireless transceiver;
a user interface coupled to the processor, the user interface comprising a display;
memory coupled to the processor;
the memory being configured to maintain storage of a first file for use with a voice call application of the mobile station, the first file including a telephone number which is utilized for identifying or contacting a user of the mobile station in the voice call application;
the memory being further configured to maintain storage of a second file for use with a electronic mail (e-mail) application of the mobile station, the second file including an e-mail address which is utilized for identifying or contacting the user of the mobile station in the e-mail communication application;
the processor being configured to receive, via the user interface, a draft e-mail message, and cause the draft e-mail message to be displayed in the display with use of the e-mail communication application;
the processor being configured to detect a selection of an option to add user-specific information items to the draft e-mail message while the draft e-mail message is being displayed;
the processor being further configured to automatically group at least the telephone number and the e-mail address in the draft e-mail message in response to detecting the selection of the option, by performing the following acts:
reading, by the processor from the first file, the telephone number which is utilized for identifying or contacting the user in the voice call application;
storing, by the processor in the draft e-mail message, the telephone number read from the first file;
reading, by the processor from the second file, the e-mail address which is utilized for identifying or contacting the user in the e-mail communication application;
storing, by the processor in the draft e-mail message, the e-mail address read from the second file, so that the telephone number and the e-mail address are automatically grouped together in the draft e-mail message in response to detecting the selection of the option; and
after the telephone number and the e-mail address have been automatically grouped by the processor in the draft e-mail message, causing the e-mail message to be transmitted, via the wireless transceiver, from the mobile station.

8. The mobile station of claim 7, wherein the processor is further configured to cause a menu to be displayed in the display, the menu including the option to add the user-specific information items to the draft e-mail message.

9. The mobile station of claim 7, wherein the memory is further configured to maintain storage of a third file for use with a PIN messaging application of the mobile station, the third file including a personal identification number (PIN) which is utilized for identifying or contacting the user in the PIN messaging application, and the processor is further configured to:

reading, by the processor from the third file, the PIN which is utilized for identifying or contacting the user in the PIN messaging application; and
storing, by the processor in the draft e-mail message, the PIN, so that the telephone number, the e-mail address, and the PIN are automatically grouped together by the processor in the draft e-mail message in response to detecting the selection of the option.

10. The mobile station of claim 9, wherein each one of the first, second, and third user-specific information items comprises one of the following items: a user name associated with an end user of the mobile station; a telephone number of the mobile station; an e-mail address associated with an e-mail communication application of the mobile station; a personal identification number (PIN) of the mobile station; and an address associated with the end user of the mobile station.

11. The mobile station of claim 7, wherein the processor is further configured to:
cause the e-mail message to be sent through the wireless transceiver to one or more recipients via the wireless communication network.

12. The mobile station of claim 7, wherein the processor is further configured to:
cause the e-mail message to be sent through the wireless transceiver via the wireless communication network to one or more recipients.

13. The mobile station of claim 7, wherein the trigger signal is produced in response to a user selection of the option.

14. The mobile station of claim 7, wherein the telephone number comprises an International Mobile Subscriber Identification (IMSI) in the first file which is in a Subscriber Identity Module (SIM) or Removable User Identity Module (R-UIM).

15. A method for use in a mobile station for automatically grouping user contact information for a user of the mobile station in a user information file, the mobile station having a processor, a user interface which includes a display, and memory coupled to the processor, the memory being configured to maintain storage of a first file for a voice call application of the mobile station, the first file including a telephone number which is utilized for identifying or contacting the user in the voice call application, the memory being configured to maintain storage of a second file for an e-mail application of the mobile station, the second file including an e-mail address which is utilized for identifying or contact the user in the e-mail application, the method comprising the acts of:
receiving, via the user interface, with use of the e-mail communication application, a draft e-mail message, and causing the draft e-mail message to be displayed in the display;
detecting, by the mobile station, a selection of an option to add user contact information to the draft e-mail message while the draft e-mail message is being displayed;
in response to detecting the selection of the option, automatically grouping, by the mobile station, the telephone number and the e-mail address in the user information file by performing the following acts:
reading, by the mobile station from the first file, the telephone number which is utilized for identifying or contacting the user in the voice call application;
storing, by the mobile station in the user information file, the telephone number read from the first file; and
reading, by the mobile station from the second file, the e-mail address which is utilized for identifying or contacting the user in the e-mail application;

storing, by the mobile station in the user information file, the e-mail address read from the second file, so that the telephone number and the e-mail address are automatically grouped together by the mobile station in the user information file in response to detecting the selection of the option;

inserting the user information file into the draft e-mail message; and causing the e-mail message with the inserted user information file to be transmitted from the mobile station.

16. The method of claim 15, wherein the memory is further configured to maintain storage of a third file for a Personal Identification Number (PIN) messaging application of the mobile station, the third file having a PIN which is utilized for identifying or contacting the user in the PIN messaging application, the method further comprising:

reading, by the mobile station from the third file, the PIN which is utilized for identifying or contacting the user in the PIN messaging application and storing, by the mobile station in the user information file, the PIN read from the third file, so that the telephone number, the e-mail address, and the PIN are automatically grouped together by the mobile station as user information in the user information file.

17. The method of claim 15, further comprising:

causing a menu to be displayed in the display, the menu including the option to add the user-specific information items to the draft e-mail message.

* * * * *